US011259085B2

(12) United States Patent
Savage et al.

(10) Patent No.: US 11,259,085 B2
(45) Date of Patent: Feb. 22, 2022

(54) GENERATING PERSONALIZED SYNTHESIZED MEDIA

(71) Applicant: AT&T Intellectual Property I, L.P., Atlanta, GA (US)

(72) Inventors: Lauren Savage, Santa Clara, CA (US); Joshua West, Leander, TX (US); Gary Brian Temerowski, II, Flower Mound, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/870,836

(22) Filed: May 8, 2020

(65) Prior Publication Data

US 2021/0352369 A1 Nov. 11, 2021

(51) Int. Cl.
| | |
|---|---|
| H04N 21/45 | (2011.01) |
| H04N 21/25 | (2011.01) |
| H04N 21/44 | (2011.01) |
| H04N 21/4627 | (2011.01) |
| H04N 21/439 | (2011.01) |
| H04N 21/472 | (2011.01) |
| H04N 21/466 | (2011.01) |
| H04N 21/454 | (2011.01) |

(52) U.S. Cl.
CPC ....... *H04N 21/4627* (2013.01); *H04N 21/439* (2013.01); *H04N 21/44* (2013.01); *H04N 21/4532* (2013.01); *H04N 21/4542* (2013.01); *H04N 21/4662* (2013.01); *H04N 21/472* (2013.01)

(58) Field of Classification Search
CPC ........... H04N 21/4627; H04N 21/4662; H04N 21/4542; H04N 21/44; H04N 21/439; H04N 21/4532; H04N 21/472
See application file for complete search history.

(56) References Cited

U.S. PATENT DOCUMENTS

| | | | | |
|---|---|---|---|---|
| 2007/0136745 | A1* | 6/2007 | Garbow | H04N 21/8456 725/34 |
| 2008/0019576 | A1* | 1/2008 | Senftner | G06T 7/251 382/118 |
| 2012/0005595 | A1* | 1/2012 | Gavade | H04N 5/272 715/751 |
| 2012/0030699 | A1* | 2/2012 | Amin | H04N 21/4532 725/28 |
| 2014/0223475 | A1* | 8/2014 | Mcintire | G06F 16/7837 725/34 |

(Continued)

*Primary Examiner* — Alazar Tilahun (57) ABSTRACT

An example method performed by a processing system includes receiving a request from a user, wherein the request identifies a plurality of items of source content, and wherein the request indicates that the user would like to generate synthesized content from the plurality of items of source content, retrieving, by the processing system, a plurality of sets of permissions, wherein each set of permissions of the plurality of sets of permissions is associated with one item of source content of the plurality of items of source content, determining, by the processing system, whether the request can be satisfied, based on the plurality of sets of permissions, and automatically generating, by the processing system, the synthesized content using the plurality of items of source content, when the request can be satisfied based on the plurality of sets of permissions.

20 Claims, 4 Drawing Sheets

(56) References Cited

U.S. PATENT DOCUMENTS

2018/0025750 A1* 1/2018 Smith ................ G06Q 10/1053
                                                        715/724
2019/0171908 A1* 6/2019 Salavon ............... G06N 3/0481

* cited by examiner

GENERATING PERSONALIZED SYNTHESIZED MEDIA

The present disclosure relates generally to audiovisual media, and relates more particularly to devices, non-transitory computer-readable media, and methods for generating personalized synthesized content.

BACKGROUND

Modern means for creating and distributing audiovisual content, including consumer software applications, social media applications, and the like, have contributed to an increased interest in user-driven content. For instance, amateur content creators can now create relatively high-quality video content and easily share the video content with others.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for generating personalized synthesized media. In one example, a method performed by a processing system including at least one processor includes receiving a request from a user, wherein the request identifies a plurality of items of source content, and wherein the request indicates that the user would like to generate synthesized content from the plurality of items of source content, retrieving, by the processing system, a plurality of sets of permissions, wherein each set of permissions of the plurality of sets of permissions is associated with one item of source content of the plurality of items of source content, determining, by the processing system, whether the request can be satisfied, based on the plurality of sets of permissions, and automatically generating, by the processing system, the synthesized content using the plurality of items of source content, when the request can be satisfied based on the plurality of sets of permissions.

In another example, a non-transitory computer-readable medium may store instructions which, when executed by a processing system in a communications network, cause the processing system to perform operations. The operations may include receiving a request from a user, wherein the request identifies a plurality of items of source content, and wherein the request indicates that the user would like to generate synthesized content from the plurality of items of source content, retrieving, by the processing system, a plurality of sets of permissions, wherein each set of permissions of the plurality of sets of permissions is associated with one item of source content of the plurality of items of source content, determining, by the processing system, whether the request can be satisfied, based on the plurality of sets of permissions, and automatically generating, by the processing system, the synthesized content using the plurality of items of source content, when the request can be satisfied based on the plurality of sets of permissions.

In another example, a device may include a processing system including at least one processor and a non-transitory computer-readable medium storing instructions which, when executed by the processing system when deployed in a communications network, cause the processing system to perform operations. The operations may include receiving a request from a user, wherein the request identifies a plurality of items of source content, and wherein the request indicates that the user would like to generate synthesized content from the plurality of items of source content, retrieving, by the processing system, a plurality of sets of permissions, wherein each set of permissions of the plurality of sets of permissions is associated with one item of source content of the plurality of items of source content, determining, by the processing system, whether the request can be satisfied, based on the plurality of sets of permissions, and automatically generating, by the processing system, the synthesized content using the plurality of items of source content, when the request can be satisfied based on the plurality of sets of permissions.

As discussed above, modern means for creating and distributing audiovisual content, including consumer software applications, social media applications, and the like, have contributed to an increased interest in user-driven content. For instance, amateur content creators can now create relatively high-quality video content and easily share the video content with others. In some cases, the video content may be generated from footage filmed by the user (e.g., the amateur content creator). In other cases, the video content may comprise a synthesis of footage filmed by the user with footage filmed by others, including professionally filmed footage (e.g., television series, movies, etc.), or may simply be a synthesis of different segments of professionally filmed footage.

For instance, one specific type of synthesized content is known as a "deepfake." Some deepfakes may replace an original actor in a first filmed scene with footage of a second, different actor from a second, different scene. Other deepfakes may synthesize multiple items of footage of the same individual in order to generate a completely new video sequence.

Thus, deepfakes and similar techniques may allow users to create content that is highly customized to the viewer's specific interests. At present, however, a vast majority of deepfakes are created in a haphazard and unauthorized manner, which has resulted in a number of legal and moral concerns. For instance, in many if not most cases, the individuals whose likenesses are being altered may have no say in or knowledge of the alteration of their likenesses. Thus, an actor could be depicted as appearing in a situation that he might find objectionable (e.g., a genre he would not voluntarily appear in, expressing views that are contrary to his personal beliefs, etc.).

Examples of the present disclosure provide a generative content platform via which users (e.g., content consumers) may generate synthesized content by selecting from a library of licensed media items that have been pre-authorized for use in synthesized content. Each media item that is available through the library may have a unique set of permissions associated with the media item, where the set of permissions defines any limits on the manner in which the media item may be used. The platform therefore allows users to create content that is highly personalized, while ensuring that the content does not infringe on the legal or moral rights of the individuals who are depicted in the content. In further examples, the individuals who are depicted in the content may be able to monetize their participation in the platform, e.g., by granting permission for their likenesses to be used in approved ways in exchange for compensation. These and other aspects of the present disclosure are discussed in greater detail below in connection with the examples of FIGS. 1-4.

Figure 1:
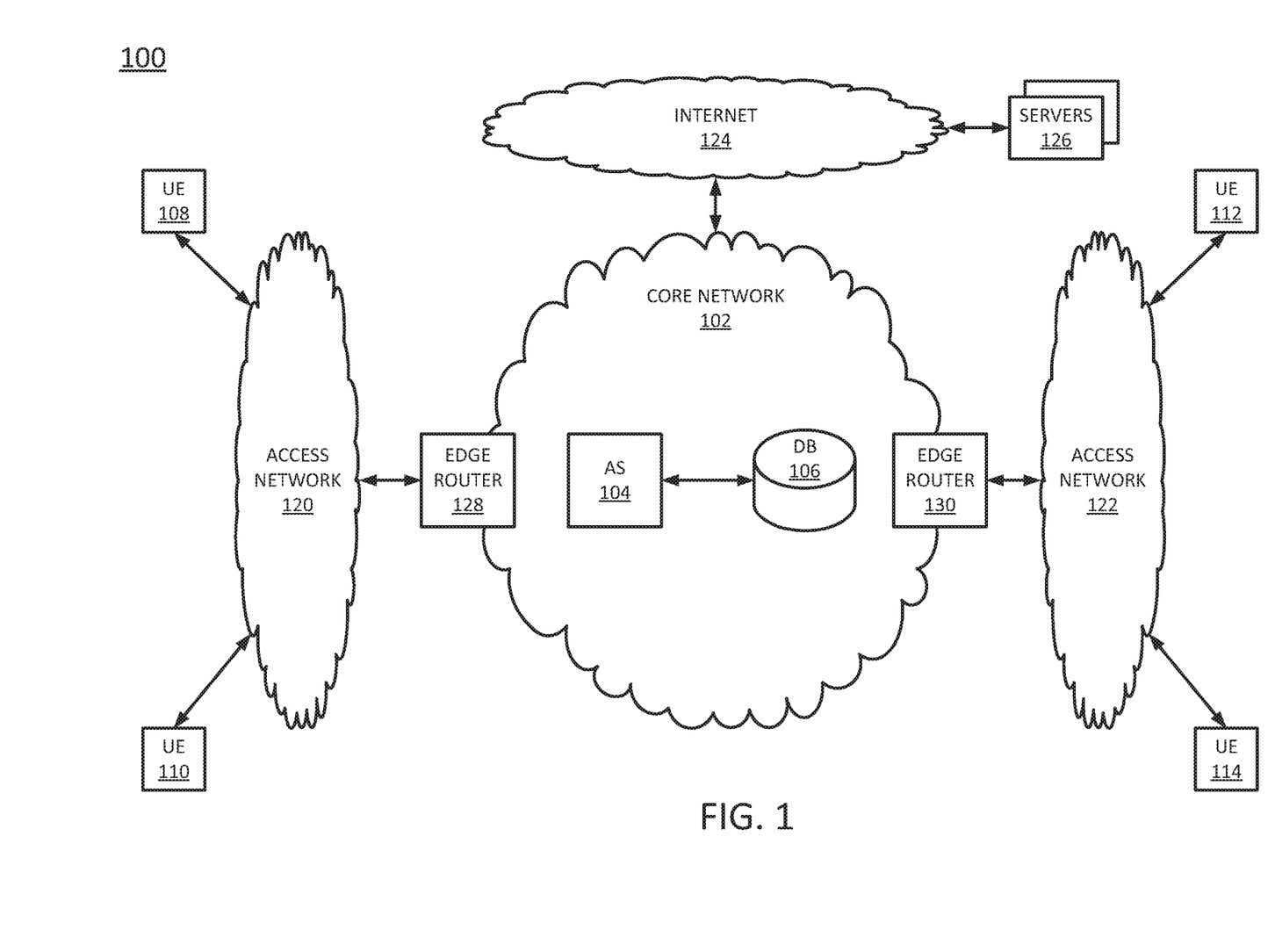
FIG. 1 illustrates an example system in which examples of the present disclosure for generating personalized synthesized content may operate.

To further aid in understanding the present disclosure, FIG. 1 illustrates an example system 100 in which examples of the present disclosure for generating personalized synthesized media may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may operate in a manner similar to the AS 104, which is described in further detail below.

Figure 2:
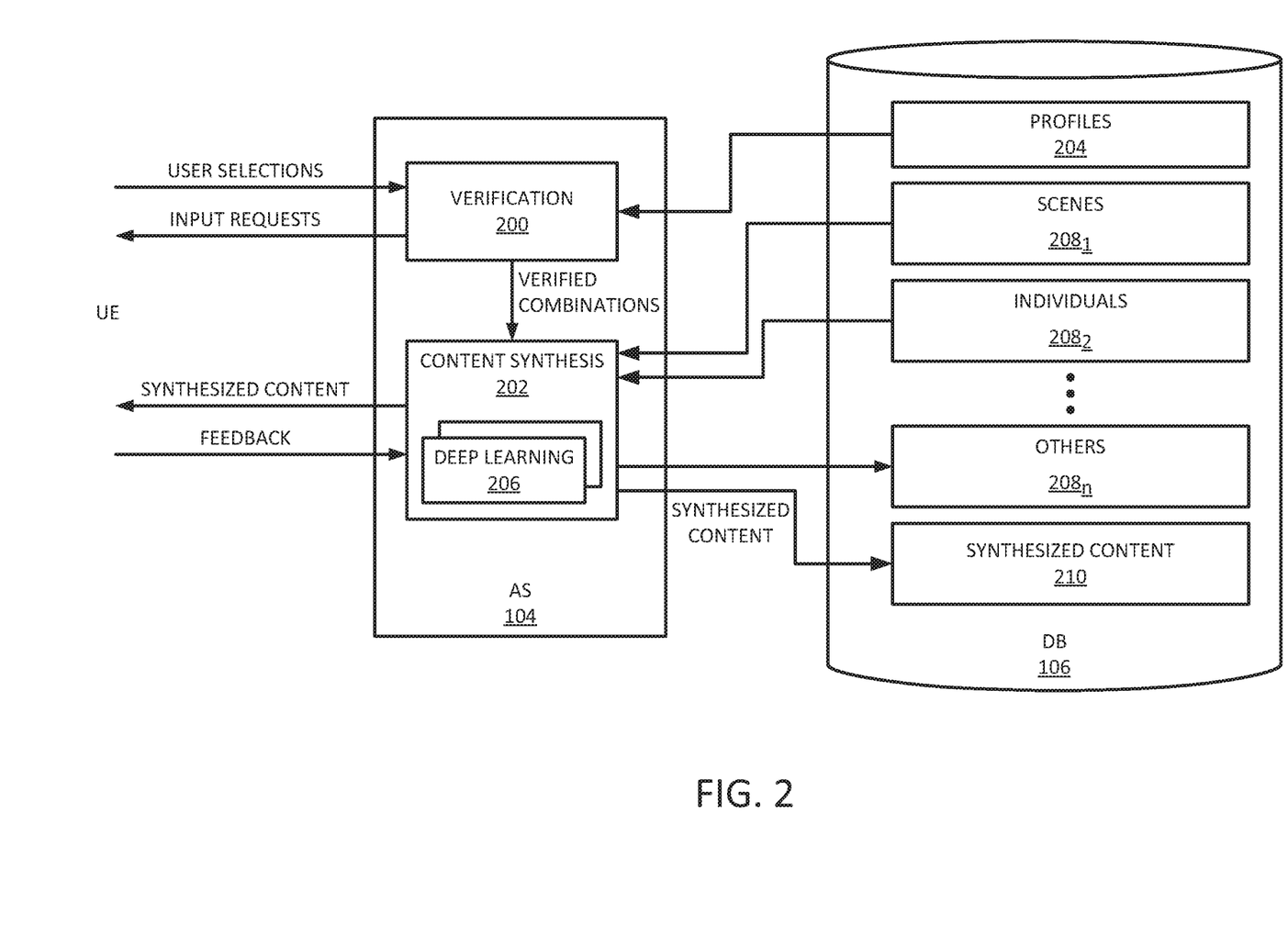
FIG. 2 illustrates the example application server and database of FIG. 1 in greater detail.

FIG. 2 illustrates the application server (AS) 104 and database (DB) 106 of FIG. 1 in greater detail. In accordance with the present disclosure, the AS 104 may be configured to provide one or more operations or functions in connection with examples of the present disclosure for generating personalized synthesized media, as described herein. For instance, the AS 104 may be configured to operate as a Web portal or interface via which a user endpoint device, such as any of the UEs 108, 110, 112, and/or 114, and may access an application for generating personalized synthesized media.

Figure 4:
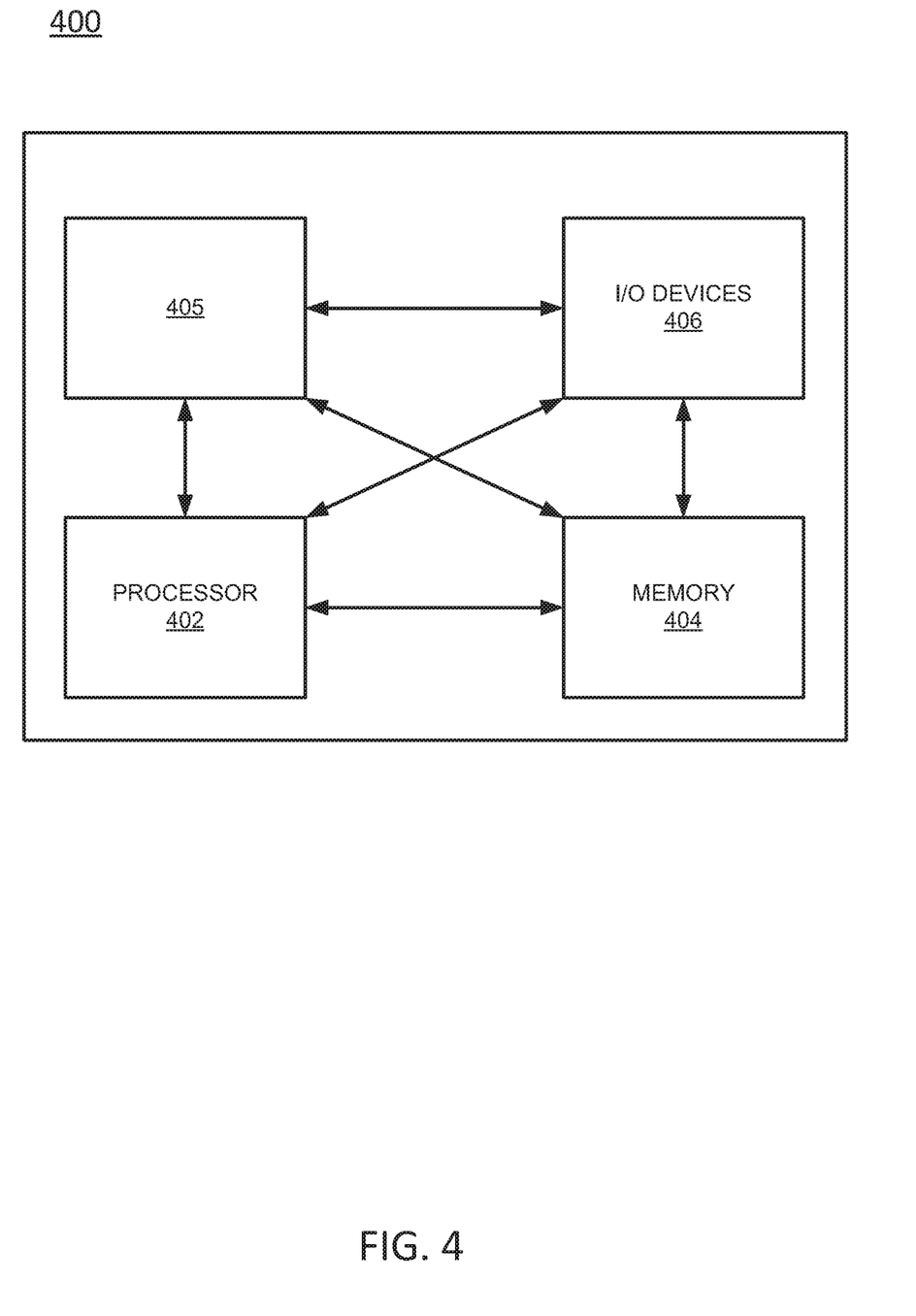
FIG. 4 illustrates an example of a computing device, or computing system, specifically programmed to perform the steps, functions, blocks, and/or operations described herein.

In accordance with the present disclosure, the AS 104 may comprise one or more physical devices, e.g., one or more computing systems or servers, such as computing system 400 depicted in FIG. 4, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

For instance, in one example, the AS 104 may comprise a verification system 200 and a content synthesis system 202. The verification system 200 may be configured to receive user selections of items of source content stored in the DB 106 and to verify that the combination of items of source content selected by the user is authorized. To this end, the verification system 200 may retrieve profiles 204 from the DB 106, where the profiles 204 comprise profiles for various items of source content stored in the DB 106 (e.g., individuals, scenes, audio recordings, special effects, and/or other content items). As discussed above, the profiles 204 may define the conditions under which the corresponding items of source content may or may not be used in synthesized content. For instance, a specific actor may upload images and video footage of his likeness, but specify that the images and video footage cannot be used in synthesized content for which the rating is higher than PG-13, for which the genre is comedy, or in which his likeness is superimposed over specific types of characters (e.g., characters of a particular gender, age, or the like).

In further examples, a profile 204 may also additional information about the corresponding item of source content (e.g., when the item of source content was created, when the item of source content was uploaded to the database, when the item of source content may be removed from the database, names of individuals, places, or things depicted in the source content, titles of songs or music heard in the item of source content, a genre of the source content, a rating of the source content, a theme or tone of the source content, an owner of the source content, etc.).

In one example, the profiles 204 may be viewable by users of the UE devices 108, 110, 112, and 114, such that a user may be able to review the limits on usages of the items of source content before including any of the items of source content in a request for synthesized content.

Thus, the verification system 200 may compare the profiles for the items of source content selected by the user in order to verify that the synthesized content requested by the user respects any limits on the usages of the items of source content. If the verification system 200 detects that any portion of the request may be problematic (e.g., a requested usage of an item of source content is not authorized), then the verification system 200 may request further input from the user. For instance, the verification system may identify the requested usages that are problematic and may ask the user to modify those requested usages. In some examples, the verification system 200 may recommend one or more proposed modifications from which the user may select, where the proposed modifications attempt to come as close as possible to satisfying the requested usage while using items of source content that are authorized to be use in the manner requested. For instance, if the request involved substituting Actor A for Actor B in a romantic comedy, but Actor A has not authorized his likeness to be used in romantic comedies, then the verification system 200 could propose substituting Actor C for Actor B instead (where Actor C may share some resemblance with Actor A).

The content synthesis system 202 may be configured to synthesize verified combinations of items of source content stored in the DB 106 (i.e., user-requested combinations of items of source content that have been verified by the verification system 200 as described above). In one example, the content synthesis system 202 may comprise one or more deep learning algorithms 206 which may be used to generate synthesized content from two or more items of source content. The deep learning techniques may include generative neural network architectures, such as variational auto-encoders, generative adversarial networks, and the like.

The AS 104 may have access to at least one database (DB) 106, where the DB 106 may store various items of source content $208_1$-$208_n$ (hereinafter individually referred to as an "item of source content 208" or collectively referred to as "items of source content 208") that are available for use in synthesized content. For instance, in one example, the items of source content may include scenes $208_1$ extracted from movies, episodes of television programs, commercials, educational videos, amateur video footage (e.g., from users' social media profiles) and other forms of audiovisual media. In further examples, the scenes $208_1$ may also include still images (e.g., movie posters, promotional photos, advertising images, amateur photos, and other types of images).

In a further example, the items of source content may also comprise images and/or video footage of individuals $208_2$ (e.g., professional and/or amateur actors, models, other celebrities, non-celebrities, animated or computer-generated characters, and the like). For instance, a well-known actor may upload close-up images and/or video footage of his likeness from various angles, or making various facial expressions. The images and/or videos may also include images of the actor in various poses or actions (e.g., running, singing, standing, sitting, etc.). The images and/or video footage may be extracted from movies, episodes of television programs, or the like, or the images and/or video footage may be specifically created to facilitate generation of synthesized content (e.g., to augment content extracted from movies, television programs, and the like in order to ensure a more faithful rendering of the individual's likeness).

The DB 106 may store other items of source content $208n$ as well, where the other items of source content $208n$ may include content such as audio content, special effects, and other types of content that may enhance the synthesized content. For instance, some of the items of source content 208 may comprise items of audio-only content, such as audio clips of specific individuals speaking, singing, or the like. The items of source content 208 may also include sound effects, songs, musical score, and other types of audio content. In a further example, the items of source content 208 may comprise visual special effects such as computer-generated imagery (CGI) effects, visual filters, and the like.

As discussed above, the DB 106 may also store a plurality of profiles 204, where each profile is associated with one of the items of source content 208. In addition to the limitations on usage discussed above, the profile for an item of source content 208 may also specify a licensing fee for use of the item of source content 208 in synthesized content. In one example, the fee may vary based on the nature and/or duration of the use. For instance, a specific actor may charge more money when his likeness is used in a comedic context versus an action context. Additionally, the licensing fee may increase with the amount of time for which the item of source content 208 is being used (e.g., utilizing an actor's likeness in one scene of a movie may cost less than using the likeness throughout the movie). Similarly, the licensing fee may increase if the synthesized content including the item of source content 208 is shared with others (e.g., others in addition to the user under whose direction the synthesized content is generated), or the profile for the item of source content 208 may specify that the synthesized content may not be shared. The profile may also specify if, when, and for how long an item of synthesized content utilizing the item of source content 208 can be stored.

In one example, all items of source content 208 that are stored in the DB 106 have been uploaded to the DB 106 with permission from the owners of and/or individuals depicted in the items of source content 208. The DB 106 may also store items of synthesized content 210 that have been generated by the AS 104. For instance, a user who has utilized the AS 104 to generate synthesized content may wish to save the synthesized content for repeated viewings or for sharing with others.

In one example, DB 106 may comprise a physical storage device integrated with the AS 104 (e.g., a database server or a file server), or attached or coupled to the AS 104, to items of content, profiles, and/or synthesized content, in accordance with the present disclosure. In one example, the AS 104 may load instructions into a memory, or one or more distributed memory units, and execute the instructions for generating personalized synthesized media, as described herein. An example method for generating personalized synthesized media is described in greater detail below in connection with FIG. 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 3:
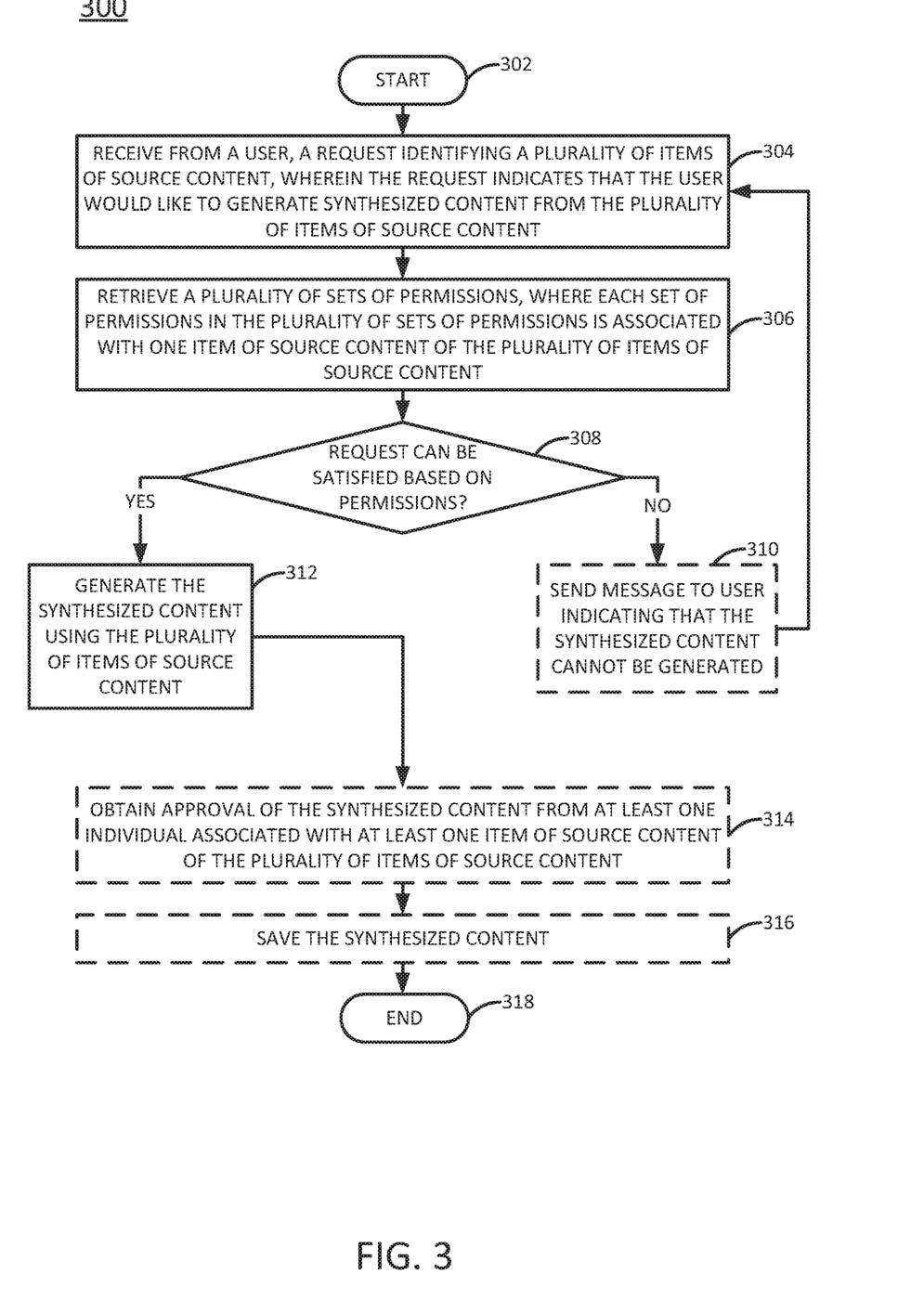
FIG. 3 illustrates a flowchart of an example method for generating personalized synthesized media, in accordance with the present disclosure.

FIG. 3 illustrates a flowchart of an example method 300 for generating personalized synthesized media, in accordance with the present disclosure. In one example, steps, functions and/or operations of the method 300 may be performed by a device as illustrated in FIG. 1, e.g., AS 104 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 300 is described in greater detail below in connection with an example performed by a processing system, such as processing system 402.

The method 300 begins in step 302 and proceeds to step 304. At step 304, the processing system may receive, from a user, a request identifying a plurality of items of source content, wherein the request indicates that the user would like to generate synthesized content from the plurality of items of source content. For instance, in one example, the plurality of items of source content may comprise at least: (1) a first video scene (e.g., a video sequence extracted from a movie, an episodes of a television program, a commercial, an educational video, amateur video footage, and/or another form of audiovisual media) depicting a first individual; and (2) a likeness of second individual, where the second individual's likeness is to replace the likeness of the first individual in the first video scene.

In further examples, the plurality of items of source content may comprise additional items of source content. For instance, the first scene may include a first audio component, and the plurality of items of source content may include a second audio component that is to replace the first audio component in the first scene. Alternatively, an audio component may be added to the first scene without replacing an existing audio component. The audio component may comprise a vocal track (e.g., where the second individual's voice may replace the first individual's voice in the scene, or a new vocal track may be added to the scene), musical components (e.g., where the score or a songs that is part of the scene's soundtrack is to be replaced with a new score or song, or a score or song is to be added), sound effects (e.g., explosions, weather effects, or the like), or other audio components.

In further examples still, the plurality of items of source content may further comprise special effects that the user may wish to add to the scene (e.g., weather effects, CGI elements, converting a color scene to a black and white scene, adjusting the camera focus or the background, etc.).

In one example, the plurality of items of source content may comprise items of content that are stored in a database and registered with a service associated with the database. Registration of an item of source content with the service indicates that the item of source content has been authorized for use in synthesized content (potentially subject to certain limits). Registration of an item of source content with the service may also indicate that the service has enough information about the item of source content to generate high-quality synthesized content (e.g., enough images of an actor to believably substitute the actor for an original actor in a scene).

In step 306, the processing system may retrieve a plurality of sets of permissions, where each set of permissions in the plurality of sets of permissions is associated with one item of source content of the plurality of items of source content. As discussed above, the plurality of items of source content may be stored in a database. The database may also store, for each item of source content, a set of permissions, where the set of permissions may define limits on the usage of the item of source content. For instance, the second individual may not permit his likeness to be used in scenes of certain genres, in scenes that were directed by certain directors, in scenes in which certain other actors are present, in scenes having ratings above a certain threshold (e.g., PG-13), in scenes that express values not aligned with the second individual's personal beliefs, etc.

In one example, the set of permissions may be stored in a profile associated with the item of source content, where the profile may optionally include additional information about the item of source content (e.g., when the item of source content was created, when the item of source content was uploaded to the database, when the item of source content may be removed from the database, names of individuals, places, or things depicted in the source content, titles of songs or music heard in the item of source content, a genre of the source content, a rating of the source content, a theme or tone of the source content, an owner of the source content, etc.). In another example, rather than store the set of permissions (and the optional additional information) in a separate profile, this information may be stored as metadata associated with the item of source content.

In step 308, the processing system may determine whether the request can be satisfied based on the plurality of sets of permissions (e.g., whether the plurality of items of source content can be combined as indicated in the request). For instance, upon review of the plurality of sets of permissions, the processing system may determine that the second individual's likeness cannot be combined with the first scene. As an example, the second individual may not permit his likeness to be used in scenes having ratings higher than PG-13, and the first scene may have an R rating. Alternatively, the processing system may determine that a song that the request indicates should be played over the first scene is not permitted to be played in action scenes, and that the first scene is an action scene.

If the processing system determines in step 308 that the plurality of items of source content cannot be combined as indicated in the request, then the method 300 may proceed to optional step 310. In optional step 310 (illustrated in phantom), the processing system may send a message to the user indicating that the synthesized content cannot be generated. In one example, the message may include the reason why the synthesized content cannot be generated (e.g., the second individual's likeness cannot be used in scenes having ratings higher than PG-13), so that the user may attempt to adjust the request in a manner to satisfy the plurality of sets of permissions.

In another example, the message may include one or more proposed modifications to the request, where the proposed modifications attempt to come as close as possible to satisfying the request while using items of source content that are authorized to be use in the manner requested. For instance, the message may propose substituting a third individual's likeness for the first individual's likeness in the first scene (where the third individual may share some resemblance with the second individual). In one example, identification of a suitable alternative for the proposed modification may be facilitated by the profile and/or metadata associated with at least one of the items of source content. For instance, the metadata associated with the third individual's likeness may indicate that the third actor shares the resemblance with the second individual (e.g., the second individual and the third individual may be twins or otherwise related, the third individual may have served as a stunt double for the second individual in the past, or the second individual and the third individual may share certain physical features such as the same eye color, height, build, nose, or the like).

The method 300 may then return to step 304 and may proceed as described above, where the request received is now a modified request (which may or may not include a modification proposed by the processing system).

Alternatively, if the processing system determines in step 308 that the plurality of items of source content can be combined as indicated in the request, then the method 300 may proceed to step 312. In step 312, the processing system may generate the synthesized content using the plurality of items of source content. In one example, generation of the synthesized content may comprise applying one or more deep learning algorithms to the plurality of items of source content in order to combine the plurality of items of source content. In one example, at least one of the deep learning algorithms may comprise a generative neural network architecture, such as a variational autoencoder, a generative adversarial network, and/or the like.

For instance, as discussed above, the synthesized content may comprise the first scene, but with the first individual's likeness (and, optionally, voice) replaced by the second individual's likeness (and, optionally, voice). Additional modifications to the first scene may be made based on any additional items of source content identified in the request. For instance, a first song playing in the first scene may be replaced with a second song, a first item appearing in the first scene may be replaced with a second item (e.g., a vehicle in the first scene may be replaced with a vehicle of a different make, model, and/or color), or other modifications may be made.

In optional step 314 (illustrated in phantom), the processing system may obtain approval of the synthesized content from at least one individual associated with at least one item of source content of the plurality of items of source content. For instance, the at least one individual may be an owner of the at least one item of source content or an individual depicted in the at least one item of source content. Obtaining the approval of the at least one individual may provide further assurance that the synthesized content respects any specified limits on usage of the at least one item of source content.

In optional step 316 (illustrated in phantom), the processing system may save the synthesized content. For instance, the synthesized content may be saved to a database from which the synthesized content may be accessible by the user. In one example, saving the synthesized content may include applying a security feature to the synthesized content (e.g., by encrypting the synthesized content, generating a hash of the synthesized content, inserting a watermark into the synthesized content, etc.). In one example, saving the synthesized content may also include applying one or more access settings to the synthesized content. For instance, the access settings may specify whether other users (e.g., users other than the user from whom the request came) are permitted to access the synthesized content from the database.

The method 300 may end in step 318.

Examples of the present disclosure therefore provide a way for individual users to generate highly personalized synthesized content that is targeted to the individual users' interests, while also respecting the rights and privacy of the individuals associated with the source content from which the synthesized content is derived (and optionally providing monetary compensation for use of the source content). There are a plurality of scenarios in which such personalized synthesized content may be desirable.

For instance, in one case, a user may wish to replace the original actors appearing in a film with a new set of actors that is more diverse (e.g., from an ethnic, gender-based, or other perspective) or more targeted to the user's interests. As an example, a set of male actors appearing in an action film may be replaced with a set of female actors. As another example, a couple of a first ethnicity appearing in a romantic comedy film may be replaced with a couple of another ethnicity.

In another example, a user may simply have a favorite actor, and may wish to see that favorite actor appearing in more content. Thus, the user may generate synthesized content that substitutes the favorite actor for an original actor in a movie or television show. Similarly, the user may feel that another actor other than an original actor may be better suited for a particular role. In further examples, a user may replace one or more original actors in a television series with one or more new actors, and may maintain the replacement of actors across the entire series, e.g., such that the new actors can be followed through the series.

In another example, a user may wish to incorporate original, user created content into the synthesized content. For instance, at least one item of source content of the plurality of items of source content may be provided by the user. As an example, the first scene may comprise a scene of amateur film footage shot by the user, where the user wishes to insert his favorite actor into the first scene. Alternatively, the second actor may be the user, where the user provides images or video footage of himself so that his likeness can replace the first actor's likeness in a scene of his favorite movie. In yet another example, the user may wish to replace a song playing in the first scene with a song that the user has written and/or performed.

In the case where a user-generated item of source content is to be incorporated in the synthesized content, examples of the present disclosure may require that the user-generated item of source content first be uploaded to the database so that the user-generated content can be vetted (e.g., so that it can be confirmed that the user owns and has the legal right to use the user-generated content and is not just trying to bypass copyright or privacy laws). In another example, the user may provide the user-generated item of content to the processing system via direct upload to the processing system (e.g., bypassing the database). In this case, the user may be presented with a dialog to confirm ownership of the user-generated item of content, and optionally to approve storage of the user-generated item of content in the database.

In further examples, examples of the present disclosure may be used to create composites of two or more individuals. For instance, a composite of two or more actors may be created, and the composite's likeness may be substituted for the likeness of an original actor in a scene.

Similarly, examples of the present disclosure may be used to combine scenes from different source material (e.g., scenes from different movies, television episodes, and the like) in order to generate synthesized content that has a new storyline. In other words, scenes from different storylines may be synthesized and concatenated in order to produce a new storyline.

Thus, the combinations of source content that may be generated by examples of the present disclosure are nearly infinite, and may allow users to create synthesized content that is tailored to almost any interest, including interests that may be underserved and underrepresented in more mainstream media. Moreover, the users may be provided with assurances that the combinations are generated in a manner that protects the legal and moral interests of the individuals from whom the source content is derived.

From the content creator side, the generation of the synthesized content may be less costly than, say, filming the requested combination of content from scratch. Moreover, the generation of the synthesized content may provide content creators, actors, and other individuals associated with the source content with new ways to monetize existing source content.

It should be noted that the method 300 may be expanded to include additional steps or may be modified to include additional operations with respect to the steps outlined above. In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for generating personalized synthesized media, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300 or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for generating personalized synthesized media (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for generating personalized synthesized media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    receiving, by a processing system including at least one processor, a request from a user, wherein the request identifies a plurality of items of source content, and wherein the request indicates that the user would like to generate synthesized content from the plurality of items of source content;
    retrieving, by the processing system, a plurality of sets of permissions, wherein each set of permissions of the plurality of sets of permissions is associated with one item of source content of the plurality of items of source content;
    determining, by the processing system, that the request cannot be satisfied, based on the plurality of sets of permissions;
    proposing, by the processing system, a potential modification to the request, wherein the request as modified by the potential modification can be satisfied based on the plurality of sets of permissions; and
    automatically generating, by the processing system when the user indicates an acceptance of the potential modification, the synthesized content using the plurality of items of source content, based on the request as modified by the potential modification.

2. The method of claim 1, wherein the plurality of items of source content comprises:
    a first video scene depicting a first individual; and
    a likeness of second individual, wherein the request indicates that the likeness of the second individual is to replace a likeness of the first individual in the first video scene.

3. The method of claim 2, wherein the first video scene comprises a video sequence extracted from at least one of: a movie, an episode of a television program, a commercial, an educational video, and an amateur video footage.

4. The method of claim 2, wherein the plurality of items of source content further comprises an audio component.

5. The method of claim 4, wherein the audio component comprises at least one selected from the group of: a vocal track, a musical score, a song, and a sound effect.

6. The method of claim 2, wherein the plurality of items of source content further comprises a special effect.

7. The method of claim 2, wherein a first set of permissions of the plurality of sets of permissions specifies a threshold rating, and wherein the likeness of the second individual is not permitted to be synthesized with video scenes having ratings that are higher than the threshold rating.

8. The method of claim 2, wherein a first set of permissions of the plurality of sets of permissions specifies a genre of video scenes in which the likeness of the second individual is not permitted to be used.

9. The method of claim 2, wherein a first set of permissions of the plurality of sets of permissions specifies that the likeness of the second individual is not permitted to be used in scenes that express values not aligned with personal beliefs of the second individual.

10. The method of claim 1, wherein the each set of permissions defines at least one limit on a usage of the one item of source content.

11. The method of claim 1, wherein the determining comprises:
    determining, by the processing system, that the plurality of items of source content cannot be combined as indicated in the request and in a manner that respects the plurality of sets of permissions.

12. The method of claim 1, wherein the generating comprises:
    applying, by the processing system, a deep learning algorithm to the plurality of items of source content in order to combine the plurality of items of source content in a manner that is consistent with the request as modified by the potential modification.

13. The method of claim 12, wherein the deep learning algorithm comprises a generative neural network architecture.

14. The method of claim 13, wherein the generative neural network architecture comprises at least one selected from the group of: a variational autoencoder and a generative adversarial network.

15. The method of claim 1, further comprising:
    obtaining, by the processing system and subsequent to the generating, an approval of the synthesized content from at least one individual associated with at least one item of source content of the plurality of items of source content.

16. The method of claim 15, wherein the at least one individual is an owner of the at least one item of source content.

17. The method of claim 15, wherein the at least one individual is an individual depicted in the at least one item of source content.

18. The method of claim 1, wherein at least one item of source content of the plurality of items of source content is created by the user.

19. A non-transitory computer-readable medium storing instructions which, when executed by a processing system including at least one processor, cause the processing system to perform operations, the operations comprising:
    receiving a request from a user, wherein the request identifies a plurality of items of source content, and wherein the request indicates that the user would like to generate synthesized content from the plurality of items of source content;
    retrieving a plurality of sets of permissions, wherein each set of permissions of the plurality of sets of permissions is associated with one item of source content of the plurality of items of source content;

determining that the request cannot be satisfied, based on the plurality of sets of permissions;

proposing a potential modification to the request, wherein the request as modified by the potential modification can be satisfied based on the plurality of sets of permissions; and automatically generating, when the user indicates an acceptance of the potential modification, the synthesized content using the plurality of items of source content, based on the request as modified by the potential modification.

20. A device comprising:

a processing system including at least one processor; and a non-transitory computer-readable medium storing instructions which, when executed by the processing system, cause the processing system to perform operations, the operations comprising:

receiving a request from a user, wherein the request identifies a plurality of items of source content, and wherein the request indicates that the user would like to generate synthesized content from the plurality of items of source content;

retrieving a plurality of sets of permissions, wherein each set of permissions of the plurality of sets of permissions is associated with one item of source content of the plurality of items of source content;

determining that the request cannot be satisfied, based on the plurality of sets of permissions;

proposing a potential modification to the request, wherein the request as modified by the potential modification can be satisfied based on the plurality of sets of permissions; and automatically generating, when the user indicates an acceptance of the potential modification, the synthesized content using the plurality of items of source content, based on the request as modified by the potential modification.

\* \* \* \* \*